U. G. PHIPPEN.
DEVICE FOR PREVENTING RUNAWAYS.
APPLICATION FILED JUNE 4, 1910.
990,455.
Patented Apr. 25, 1911.
2 SHEETS—SHEET 1.
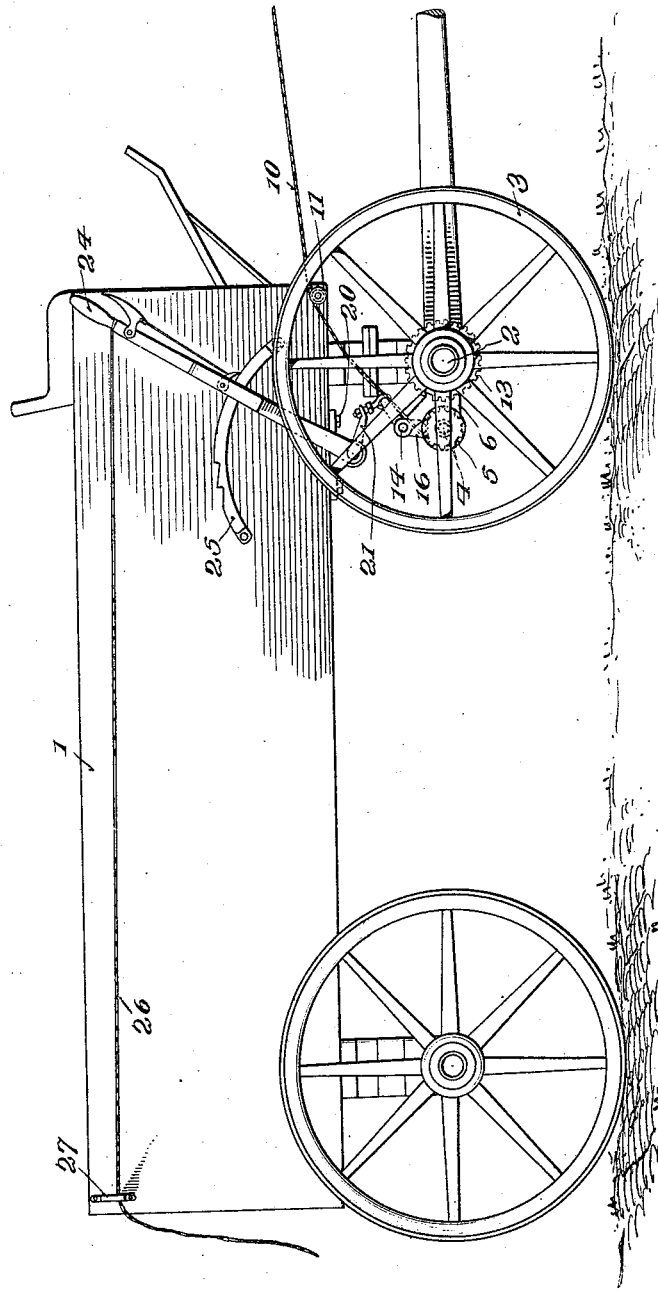
Witnesses
Inventor
U. G. Phippen
By ............, Attorneys

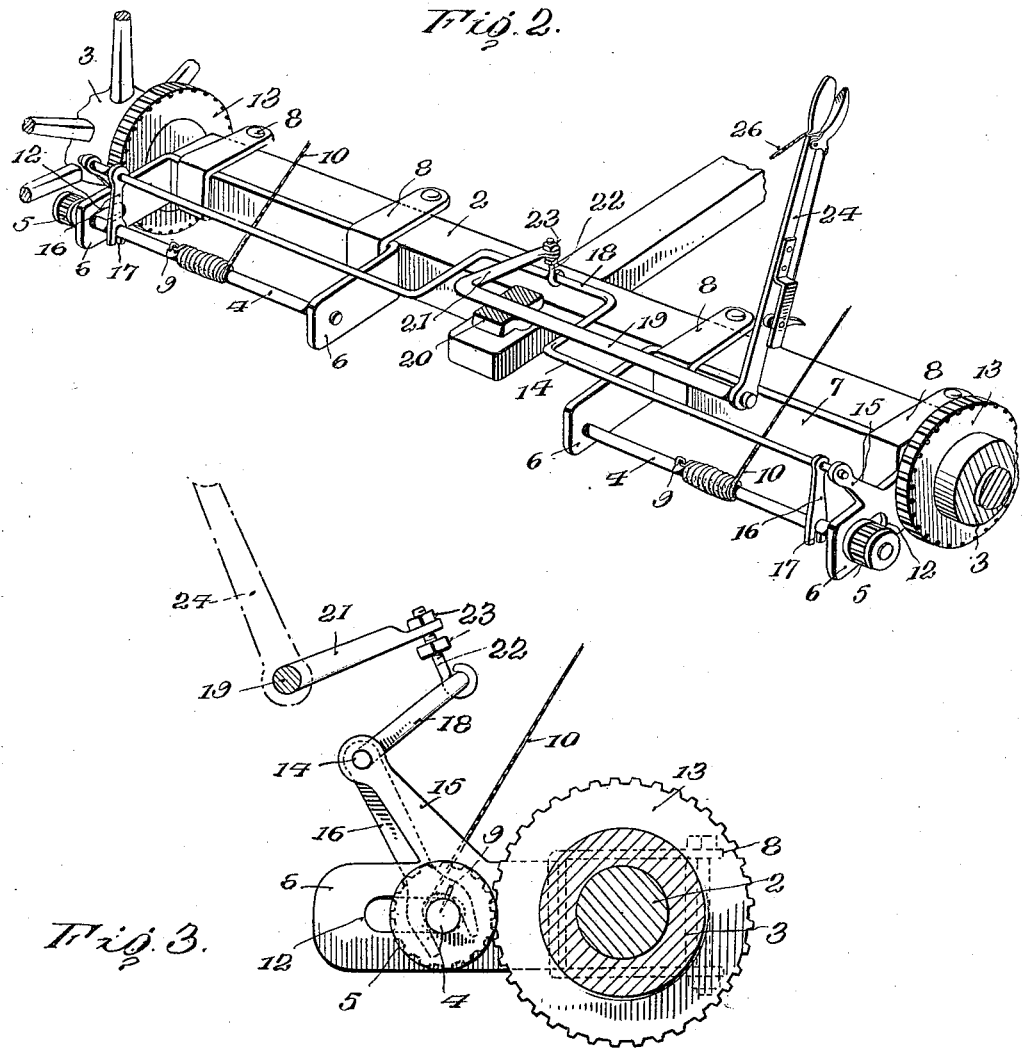

UNITED STATES PATENT OFFICE.

ULYSSES G. PHIPPEN, OF HUGO, OKLAHOMA.

DEVICE FOR PREVENTING RUNAWAYS.

990,455. Specification of Letters Patent. Patented Apr. 25, 1911.

Application filed June 4, 1910. Serial No. 565,074.

*To all whom it may concern:*

Be it known that I, ULYSSES G. PHIPPEN, a citizen of the United States, residing at Hugo, in the county of Choctaw and State of Oklahoma, have invented certain new and useful Improvements in Devices for Preventing Runaways, of which the following is a specification.

The object of the present invention is an improved device for preventing runaways, the invention being particularly simple and efficient and being susceptible of application to various kinds of vehicles.

Another object of the invention is a device of this character which may be easily and quickly operated and is positive and reliable in action, and which is arranged to pull backwardly on the bits of the horses with considerable force in order to check their progress.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawings, in which:

Figure 1 is a side elevation of a wagon equipped with the improvements of my invention; Fig. 2 is a detail perspective view of the fore-axle showing the parts of the device mounted thereon; Fig. 3 is a transverse section of the fore-axle.

Corresponding and like parts are referred to in the following description and indicated in all the views of the drawings by the same reference characters.

My improved device for preventing runaways is susceptible of use in connection with carriages, wagons, and other vehicles, and in the present instance is shown, for the purpose of illustration, as applied to a wagon.

In the drawings, numeral 1 designates the body of the wagon, 2 designates the pivoted fore-axle, and 3 designates the vehicle wheels on the ends of the fore-axle.

The invention includes two independent winding shafts 4 which are supported at the rear side of the fore-axle 2 and which are disposed in the direction of the length thereof and are spaced apart longitudinally. The remote or outer ends of the winding shafts terminate in proximity to the hubs of the wheels 3 and have gear wheels 5 fixed thereon. Each winding shaft is mounted in a pair of longitudinally spaced bearing brackets 6 projecting substantially perpendicularly rearwardly from the ends of an elongated base plate 7, the base plate abutting against the rear face of the fore-axle and being secured thereto by axle clips 8. Between the spaced bearing clips each winding shaft is provided with an outstanding loop or ear 9 to which is secured a line or rein 10 that is designed to be wound on said shaft. The lines pass forwardly and upwardly from the respective winding shafts and preferably engage suitable guides 11 which are secured at the front of the body 1 and serve to support the lines above the draft trees. From the guides the lines lead to the bits of the respective horses where the wagon is drawn by two horses, as in the present instance. If the vehicle is drawn by only one horse the lines may be both secured to the single bit. The outer bearing brackets, that is, the brackets located in proximity to the ends of the axle, are arranged at the inner side of the respective gear wheels 5 and are formed with slots 12 in which the winding shafts operate. The slots permit the winding shafts to be shifted laterally with respect to their axes to move the gear wheels 5 into and out of mesh with annular series of gear teeth 13 that encircle the inner ends of the hubs of the wheels 3 and are rotatable therewith.

A rock shaft 14 extends transversely beneath the vehicle body and above the guiding shafts and is journaled at its ends in the outer or extreme bearing brackets 6, said brackets being preferably extended upwardly for this purpose, as indicated at 15. Shifter arms 16 are fixed on the rock shaft in proximity to its opposite ends and depend therefrom and are slotted, as indicated at 17, to embrace the respective winding shafts 4 at the inner side of the outer brackets. Intermediate of its ends the rock shaft is formed with a crank 18.

Any suitable means may be connected to the crank for turning the rock shaft, so as to cause the slotted arms 16 to shift the winding shafts in the slots 12. As one means for accomplishing this object I provide an actuating shaft 19 which is disposed transversely beneath the wagon body and is journaled in suitable hanger bearings 20. The actuating shaft is provided with a substantially perpendicular arm 21 that projects forwardly and is operatively connected to a crank 18 through the medium of a link 22. The link is formed at one end with an eye which is loosely mounted on the crank, the other end portion of the link being threaded to pass freely through an aperture in the extremity of the arm 21. A pair of nuts 23 work on threaded portion of the link and abut against opposite sides of the arm 21 to hold the link in swivel engagement with the arm. This particular form of connection between the crank and the arm, is quite desirable since it compensates for the turning of the fore-axle about its pivot. The actuating shaft is adapted to be turned by means of a hand lever 24 that extends upwardly at one side of the body 1 and is latched to a segment 25 secured at said side of the body. When the lever is at the forward end of the segment the shifter arms 16 hold the winding shafts at the rear ends of the slots 12 so that the gear wheels are out of engagement with the gear teeth 13.

In practice the operation of the device may be easily and quickly effected when occasion requires, by merely swinging the hand lever 24 to the rear end of the segment 25. The actuating shaft 19 is thereby turned, and such movement is transmitted to the shaft 14 through the medium of the link 22 and the crank 18. The turning movement of the rock shaft causes the shifter arms 16 to be swung forwardly, whereby to simultaneously move the winding shafts toward the forward ends of the slots 12 to cause the gear wheels 5 to mesh with the gear teeth 13. By virtue of this gearing connection the winding shafts are driven from the front wheels 3 of the vehicles so as to wind up the lines 10 and to draw backwardly on the horses' bits with considerable force to prevent the horses from running away. The forward movement of the vehicle is thus checked. Attention is particularly directed to the fact that the winding shafts are entirely separate and have independent rotation for the purpose of compensating for any difference in the speed of the vehicle wheels, as for instance, when the vehicle is turning a curve. By setting the hand lever to hold the gears in mesh, the vehicle may be safely left without an attendant, it being unnecessary to employ the ordinary hitching weights or the like, which have been found to be objectionable in practice.

A trip cord 26 is preferably secured to the hand lever 24 and passes rearwardly through one or more guides 27 with one end depending at the rear of the body 1. The object of this cord is to enable the hand lever to be manipulated from the rear of the wagon to actuate the device. The wagon may thus be brought to a standstill by a pedestrian in case the horses should run away when there are no occupants in the vehicle to operate the hand lever.

From the foregoing description in connection with the accompanying drawings, it will be apparent that I have provided an improved device which is quite effectual for preventing runaways, which is simple and durable in construction, and which is susceptible of general application.

It is to be understood that, if desired, the device may be operated by a foot lever in lieu of the hand lever or in addition thereto.

Having thus described the invention, what I claim is:

1. The combination with a wheeled vehicle, of a pair of separate winding shafts journaled on the vehicle and having independent rotation, lines connected to and adapted to be wound on the shafts, gearing connecting the respective shafts with traveling wheels on opposite sides of the vehicle, means for permitting the shafts to be shifted into and out of gear with said wheels, a rock shaft provided with bifurcated arms embracing the respective winding shafts, and means for turning the rock shaft to effect simultaneous shifting movement of the winding shafts.

2. The combination with a vehicle having a pivoted axle, of a winding shaft journaled on the axle, gearing connecting the shaft with a traveling wheel at one end of the axle, means mounted on the axle for throwing the shaft into and out of gear with the wheel, said means including a crank, an actuating shaft journaled on the vehicle body and having an angularly disposed arm, a link swiveled to the arm and slidably mounted on the wrist pin of the crank, and means for turning the actuating shaft.

In testimony whereof, I affix my signature in presence of two witnesses.

ULYSSES G. PHIPPEN. [L. S.]

Witnesses:
D. J. F. GERMAN,
T. W. ALLEN.

---

Copies of this patent may be obtained for five cents each, by addressing the "Commissioner of Patents, Washington, D. C."